US012737493B2

(12) United States Patent
Sheik-Nainar et al.

(10) Patent No.: US 12,737,493 B2
(45) Date of Patent: Sep. 15, 2026

(54) PRIVACY PROTECTION FOR PERSONAL COMPUTING DEVICES BASED ON ONLOOKER DETECTION AND CLASSIFICATION

(71) Applicant: Synaptics Incorporated, San Jose, CA (US)

(72) Inventors: Mohamed Ashraf Sheik-Nainar, San Jose, CA (US); Tomer Kimhi, Tel Aviv (IL); Stuart Whitfield Hutson, Austin, TX (US)

(73) Assignee: Synaptics Incorporated, San Jose, CA (US)

( * ) Notice: Subject to any disclaimer, the term of this patent is extended or adjusted under 35 U.S.C. 154(b) by 115 days.

(21) Appl. No.: 18/542,400

(22) Filed: Dec. 15, 2023

(65) Prior Publication Data

US 2025/0200213 A1 Jun. 19, 2025

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
None
See application file for complete search history.

(56) References Cited

U.S. PATENT DOCUMENTS 9,286,482 B1 3/2016 Dumont et al.
12,124,555 B2* 10/2024 Wang ...................... G06F 21/36
2011/0113488 A1* 5/2011 Schultz ............... G06F 21/6245 715/764
2022/0171875 A1* 6/2022 Jasleen ............... G06F 21/6245
2022/0269831 A1 8/2022 Kapinos et al.
2023/0065840 A1* 3/2023 Jasleen ................ G06F 21/604
2023/0069223 A1* 3/2023 Patel .................... G06Q 20/065
(Continued)

FOREIGN PATENT DOCUMENTS

WO 2022133099 A2 6/2022

OTHER PUBLICATIONS

Extended European Search Report dated Mar. 5, 2025, from EP Application No. 24219361.3.

*Primary Examiner* — Scott B Christensen
(74) *Attorney, Agent, or Firm* — Paradice & Li LLP

(57) ABSTRACT

This disclosure provides methods, devices, and systems for protecting user privacy while operating a personal computing device. The present implementations more specifically relate to privacy protection techniques for personal computing devices based on onlooker detection and classification. In some aspects, a computing device may include a display, one or more sensors, and a privacy controller that receives sensor data from the one or more sensors and controls the display based on a presence or classification of onlookers associated with the received sensor data. In some implementations, the privacy controller may compare any onlookers detected from the sensor data to a database of contacts associated with the user and classify each onlooker as a "trusted onlooker" or "nontrusted onlooker" based on the comparison. More specifically, the privacy controller may selectively activate a privacy protection mechanism associated with the display based on whether a nontrusted onlooker is detected.

17 Claims, 10 Drawing Sheets

(56) References Cited

U.S. PATENT DOCUMENTS

2023/0244191 A1* 8/2023 Honkote ............ G05B 13/0265
700/47
2023/0244823 A1* 8/2023 Iyer ......................... G06F 21/84
726/26
2023/0388282 A1* 11/2023 Lin ..................... H04L 63/0807

* cited by examiner

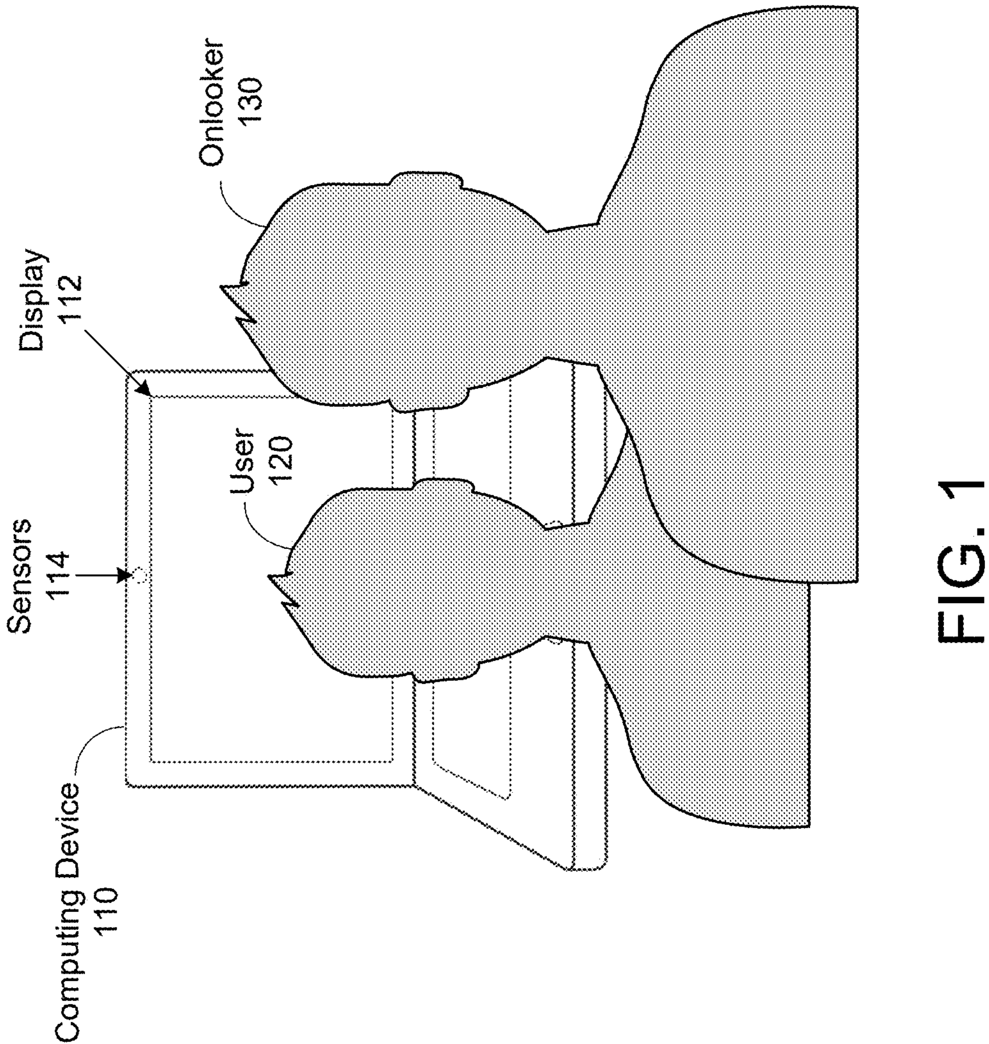
FIG. 1

PRIVACY PROTECTION FOR PERSONAL COMPUTING DEVICES BASED ON ONLOOKER DETECTION AND CLASSIFICATION

TECHNICAL FIELD

The present implementations relate generally to personal computing devices, and specifically to privacy protection for personal computing devices based on onlooker detection and classification.

BACKGROUND OF RELATED ART

Personal computing devices (such as desktop computers, laptops, smartphones, and tablets) are often used to store and access information that is personal or private to a user of the device (such as financial records, medical records, intellectual property, or other confidential or proprietary information). As such, many personal computing devices have security features (such as various user authentication mechanisms) that are designed to prevent access by unauthorized users. However, existing user authentication mechanisms cannot protect the privacy of information displayed on a personal computing device while it is being controlled or operated by an authenticated user.

As personal computing devices become more portable and feature-rich, and with a growing trend towards remote work, individuals are increasingly using their personal computing devices to access personal or private information in public spaces and other environments with potential onlookers or passersby (such as cafes, libraries, or airplanes, among other examples). Thus, there is a need to protect the privacy of information displayed on a personal computing device in the presence of onlookers or passersby without significantly impeding user access to such information on the personal computing device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by a controller for a computing device. The method includes receiving sensor data from one or more sensors associated with the computing device; identifying an authorized user of the computing device based on the received sensor data; detecting one or more objects of interest associated with the received sensor data, where the one or more objects of interest are separate from the authorized user; classifying each object of interest of the one or more objects of interest based at least in part on a database of contacts associated with the authorized user; and controlling a display associated with the computing device based on the classification of each object of interest.

Another innovative aspect of the subject matter of this disclosure can be implemented in a controller for a computing device, including a processing system and a memory. The memory stores instructions that, when executed by the processing system, cause the controller to receive sensor data from one or more sensors associated with the computing device; identify an authorized user of the computing device based on the received sensor data; detect one or more objects of interest associated with the received sensor data, where the one or more objects of interest are separate from the authorized user; classify each object of interest of the one or more objects of interest based at least in part on a database of contacts associated with the authorized user; and control a display associated with the computing device based on the classification of each object of interest.

BRIEF DESCRIPTION OF THE DRAWINGS

The present implementations are illustrated by way of example and are not intended to be limited by the figures of the accompanying drawings.

FIG. 1 shows an example environment for viewing or operating a personal computing device.

DETAILED DESCRIPTION

Figure 2:
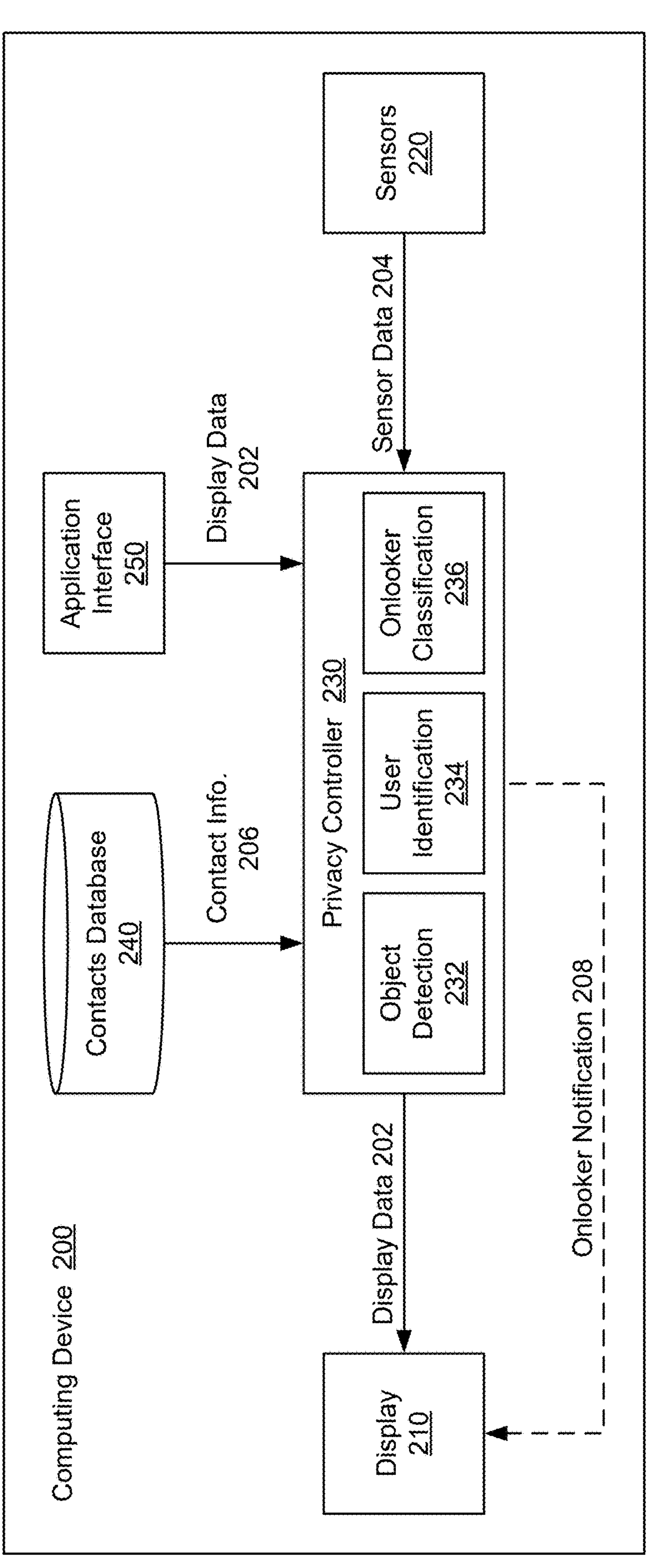
FIG. 2 shows a block diagram of an example computing device, according to some implementations.

In the following description, numerous specific details are set forth such as examples of specific components, circuits, and processes to provide a thorough understanding of the present disclosure. The term “coupled” as used herein means connected directly to or connected through one or more intervening components or circuits. The terms “electronic system” and “electronic device” may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, individuals are increasingly using their personal computing devices to access personal or private information in public spaces and other environments with potential onlookers or passersby (such as cafes, libraries, or airplanes, among other examples). To protect user privacy, some personal computing devices implement onlooker detection systems that can obfuscate information on the display or notify the user when a potential onlooker is detected in the environment. For example, many personal computing devices include cameras that can capture images or video of the surrounding environment. Such cameras are often coplanar with the display to capture images of the person using the device (such as for authentication or videoconferencing applications). Onlooker detection systems may use such images to detect potential onlookers (such as anyone other than the user of the personal computing device) in the surrounding environment.

Existing onlooker detection systems are configured to activate a privacy protection mechanism (such as by obfuscating the display or outputting an alert) if any potential onlooker is detected in the background. However, in some instances, a user may wish to show content displayed on the personal computing device to certain people nearby (such as colleagues, friends, or family). Because existing onlooker detection systems impede a user's ability to collaborate with colleagues or share displayed content, users often disable this feature on their personal computing devices. Aspects of the present disclosure recognize that many personal computing devices store (or have access to) a database of contacts that can be used to distinguish unwanted onlookers from trusted individuals that are known to or otherwise associated with the user. Example suitable databases include an address book or contacts list associated with a phone or email client, or an organizational chart or directory for a business or organization, among other examples.

Various aspects relate generally to personal computing devices, and more particularly, to privacy protection techniques for personal computing devices based on onlooker detection and classification. In some aspects, a computing device may include a display, one or more sensors, and a privacy controller that receives sensor data from the one or more sensors and controls the display based on a presence or classification of onlookers associated with the received sensor data. In some implementations, the privacy controller may compare any onlookers detected from the sensor data to a database of contacts associated with the user and classify each onlooker as a "trusted onlooker" or "nontrusted onlooker" based on the comparison. If one or more non-trusted onlookers are detected in the received images, the privacy controller may activate a privacy protection mechanism associated with the display (such as by obfuscating the display or outputting an alert). If only trusted onlookers (or no onlookers) are detected in the received images, the privacy controller may refrain from activating the privacy protection mechanism.

Particular implementations of the subject matter described in this disclosure can be implemented to realize one or more of the following potential advantages. By detecting and classifying onlookers as "trusted" or "non-trusted," aspects of the present disclosure can provide finer control for privacy protection and significantly improved user experience. For example, a user may share the contents displayed on their personal computing device with trusted individuals (such as friends, family, or colleagues) without interference by the privacy controller. As a result, the user may be more inclined to enable the privacy controller during normal operation. By leveraging existing contacts databases for onlooker classification, aspects of the present disclosure can differentiate between trusted and nontrusted onlookers in a preconfigured (or automated) manner. As a result, the privacy controller can be used without any setup or input by the user of the personal computing device.

FIG. 1 shows an example environment 100 for viewing or operating a personal computing device 110. The personal computing device 110 includes a display 112 and one or more sensors 114. The sensors 114 may implement any sensing technologies that can be used to detect objects of interest (such as humans) in the environment 100. In some implementations, the sensors 114 may include a camera or microphone that can capture images or record audio from the environment 100. Other suitable sensing technologies may include thermal, time-of-flight (ToF), and radio frequency (RF) sensing (such as using Wi-Fi, Bluetooth, or other RF signals), among other examples. The example environment 100 includes a user 120 of the computing device 110 and an onlooker 130 standing or sitting behind the user 120. In the example of FIG. 1, the user 120 and the onlooker 130 are both facing or otherwise looking at the display 112. Although only one onlooker 130 is shown in the example of FIG. 1, the environment 100 may include fewer or more onlookers in actual implementations.

As shown in FIG. 1, the onlooker 130 is outside the user's field-of-view (FOV) while the user 120 is looking at the display 112. As such, the user 120 may not be aware of the presence of the onlooker 130. In some instances, the onlooker 130 may be a friend, colleague, or other known associate of the user 120. In some other instances, the onlooker 130 may be an unknown passerby with a line of sight to the display 112. In some aspects, the computing device 110 may periodically or continuously scan the environment 100 for onlookers, using the sensors 114, while the user 120 is viewing or operating the computing device 110 and may perform one or more operations to protect the user's privacy based on a detection of onlookers in the environment 100. In some implementations, the computing device 110 may perform an object detection operation that detects humans based on sensor data captured via the sensors 114.

In some implementations, the computing device 110 may classify each person detected in the environment 100 as an "authorized user" or an "onlooker." An authorized user is a person who is registered with or otherwise authorized to use the computing device 110 (such as the user 120). By contrast, an onlooker can be any person who is not an authorized user of the computing device 110 (such as the onlooker 130). In some implementations, the computing device 100 may recognize the face or voice of an authorized user based on data provided by the user during a registration or enrollment procedure. For example, the user 120 may provide images of the user's face or voice recordings as a biometric signature for authentication. Thus, the computing device 110 may leverage existing biometric data (such as data used for face or voice recognition) to determine whether a person is an authorized user. In some implementations, the computing device 110 may classify as an onlooker any person who is not recognized as an authorized user.

In some implementations, the computing device 110 may determine a relationship between the user 120 and the onlooker 130 and may further classify the onlooker 130 as "trusted" or "nontrusted" based on the determined relationship. As used herein, the term "trusted onlooker" refers to any person having a qualified association or relationship to an authorized user of the computing device 110 (such as a friend, family member, colleague, or other known associate). However, not all known associates of an authorized user may qualify as trusted onlookers. For example, a co-worker who is employed by the same corporation as the user 120 but belongs to a different department or group within the corporation may not have permission to view some confidential information that may be stored on or otherwise accessible by the computing device 110. Any onlooker who does not meet the criteria for a trusted onlooker may be classified instead as a nontrusted onlooker.

Aspects of the present disclosure recognize that many personal computing devices store or have access to a database of contacts that includes object recognition data (such as images or voice samples) of one or more persons having a known association or relationship to an authorized user of the computing device. Example suitable databases include an address book or contacts list associated with a phone or email client, or an organizational chart or directory for a business or other organization, among other examples. Such databases may be managed by the user or by an organization to which the user belongs. In some aspects, the computing device 110 may determine a relationship between the user 120 and the onlooker 130 based on a database of contacts associated with the user 120. For example, the computing device 110 may compare an image or audio recording of the onlooker 130, captured via the sensors 114, with images or voice samples of contacts stored in the database. The computing device 110 may further determine whether the onlooker 130 is trusted (or nontrusted) based, at least in part, on whether the image or audio recording of the onlooker 130 matches an image or voice sample in the database.

In some aspects, the computing device 110 may control the display 112 to protect the privacy of the user 120 based on the classification of the onlooker 130. For example, if the onlooker 130 is classified as a trusted onlooker, the computing device 110 may continue to operate normally (without disrupting or otherwise altering the contents of the display 112). However, if the onlooker 130 is classified as a nontrusted onlooker, the computing device 110 may modify or adjust the contents of the display 112 to protect the privacy of the user 120. In some implementations, the computing device 110 may protect the user's privacy by blurring or otherwise obfuscating the content of the display 112. In some other implementations, the computing device 110 may protect the user's privacy by presenting a notification (such as a pop-up window) on the display 112 alerting the user 120 about the presence of the onlooker 130.

FIG. 2 shows a block diagram of an example computing device 200, according to some implementations. The computing device 200 is configured to protect the privacy of a user viewing or operating the computing device 200 in the presence of onlookers. In some implementations, the computing device 200 may be one example of the personal computing device 110 of FIG. 1.

The computing device 200 includes a display 210, one or more sensors 220, and a privacy controller 230. The display 210 may be any electronic display capable of rendering or displaying digital content. The sensors 220 may include any suitable sensors that can detect objects of interest proximate the display 210. In some implementations, the sensors 220 may include a camera or microphone that can capture images or record audio from the environment. For example, the camera or microphone may be positioned to capture images of a user or audio recordings while the user is operating the computing device 200 or otherwise viewing the display 210 (such as shown in FIG. 1). With reference to FIG. 1, the display 210 may be one example of the display 112 and the sensors 220 may be examples of the sensors 114.

The privacy controller 230 continuously or periodically acquires sensor data 204 from the sensors 220 and controls the display 210 based, at least in part, on the sensor data 204. More specifically, the privacy controller 230 may analyze the sensor data 204 to detect nontrusted onlookers and selectively activate one or more privacy protection mechanisms based on whether any nontrusted onlookers are detected based on the sensor data 204. In some implementations, the privacy controller 230 may include an object detection component 232, a user identification component 234, and an onlooker classification component 236. The object detection component 232 is configured to analyze the sensor data 204 for objects of interest (such as human faces or voices). For example, the object detection component 232 may perform an object detection operation on the received sensor data 204.

Object detection encompasses various techniques for detecting objects belonging to a known class (such as humans, cars, or text) based on images, audio recordings, or other sensor data. For example, the presence and location of an object can be detected or inferred from an image by scanning the image for a set of features (such as eyes, nose, and lips) that are unique to objects of a particular class (such as humans). Object detection models are generally used for feature extraction and localizing objects in images, audio recordings, or other sensor data. In some implementations, the object detection component 232 may utilize one or more statistical models for object detection. In some other implementations, the object detection component 232 may utilize one or more machine learning models for object detection.

Machine learning is a technique for improving the ability of a computer system or application to perform a specific task. During a training phase, a machine learning system is provided with multiple "answers" and a large volume of raw input data. For example, the input data may include images depicting an object of interest and the answers may include tags or bounding boxes indicating a presence or location of an object of interest. The machine learning system analyzes the input data to learn a set of rules (also referred to as the "machine learning model") that can be used to map the input data to the answers. During an inferencing phase, the machine learning system uses the trained model to infer answers (such as object detections or bounding boxes) from new input data.

The user identification component 234 is configured to classify each object of interest detected by the object detection component 232 as an authorized user or an onlooker. In some implementations, the computing device 200 may capture or acquire sensor data associated with a user (such as images of the user's face or recordings of the user's voice) during a registration or enrollment procedure and extract various features of the user (such as facial features or vocal features) from the sensor data. The user identification component 234 may compare the user's features with the features extracted from each object of interest to determine whether to classify the object as an authorized user (such as when a match is detected) or an onlooker (such as when no match is detected). In some implementations, the user identification component 234 may perform the classification based, at least in part, on a machine learning model.

The onlooker classification component 236 is configured to further classify each onlooker classified by the user identification component 234 as a trusted onlooker or a nontrusted onlooker. In some implementations, the onlooker classification component 236 may perform the classification based, at least in part, on contact information 206 stored in a contacts database 240. As described with reference to FIG. 1, the contacts database 240 may be an address book or contacts list associated with a phone or email client, or an organizational chart or directory for a business or other organization, among other examples. As shown in FIG. 2, the contacts database 240 may be stored locally on the computing device 200. In some other implementations, at least a portion of the contacts database 240 may be stored on an external server.

In some aspects, the contacts database 240 may store object recognition data from which features can be extracted and used to identify each contact. Example suitable object recognition data include contact photos and voice samples (such as previously recorded audio containing a contact's voice), among other examples. For example, many businesses and organizations assign or otherwise require contact photos as a means of identification for employees. Thus, each contact photo may include the face of a respective contact represented in the contacts database 240. In some implementations, the onlooker classification component 236 may retrieve object recognition data (such as one or more contact photos), as the contact information 206, from the contacts database 240 and extract various features from the object recognition data. The onlooker classification component 236 may further compare the extracted features for each contact with the features extracted from each object of interest classified as an onlooker to determine whether to classify the onlooker as a trusted or nontrusted onlooker.

In some implementations, the onlooker classification component 236 may use a machine learning model to compare the features of an onlooker with the features of a contact. For example, the machine learning model may indicate whether the features of the onlooker match the features of the contact. If no match is detected between a given onlooker and any of the contacts in the contacts database 240, the onlooker classification component 236 may classify the onlooker as a nontrusted onlooker. In some implementations, the onlooker classification component 236 may classify an onlooker as a trusted onlooker as long as a match is detected between the onlooker and one of the contacts in the contacts database 240. In such implementations, it may be assumed that the contacts database 240 only stores contact information 206 for trusted contacts or that the onlooker classification component 236 only retrieves contact information 206 for trusted contacts in the contacts database 240.

In some other implementations, if a match is detected between an onlooker and a contact in the contacts database 240, the onlooker classification component 236 may analyze additional contact information 206 to determine whether to classify the onlooker as a trusted (or nontrusted) onlooker. Example suitable contact information may include, among other examples, a history of communications or collaboration with the matching contact or a relationship to the matching contact. For example, a contact who collaborates more frequently with the user is more likely to be classified as a trusted onlooker than a contact who collaborates less frequently with the user. Further, a contact who belongs to the same group or department as the user is more likely to be classified as a trusted onlooker than a contact who belongs to a different group or department than the user.

In some aspects, the privacy controller 230 may selectively alter or augment display data 202 provided to the display 210 based on whether nontrusted onlookers are detected from the sensor data 204. The display data 202 may include any content being viewed or accessed by a user of the computing device 200. For example, the privacy controller 230 may receive the display data 202, via an application interface 250, from an application executing on the computing device 200. In some implementations, the privacy controller 230 may obfuscate the display data 202 (so that content on the display 210 appears blurry, texturized, or opaque) in response to detecting a nontrusted onlooker. In some other implementations, the privacy controller 230 may output an onlooker notification 208 to the display 210 (as a pop-up window or overlay on top of the display data 202) in response to detecting a nontrusted onlooker.

In some aspects, at least a portion of the privacy controller 230 may be implemented by (or execute on) an application-specific integrated circuit (ASIC) separate from a central processor of the computing device 200 that executes various other applications (such as an operating system). In some implementations, the ASIC may provide a trusted execution environment (TEE) for object detection and classification so that the sensor data 204 received via the sensors 220 are inaccessible to software or hardware outside the TEE. For example, the TEE may include the object detection component 232, the user identification component 234, and the onlooker classification component 236. In such implementations, the ASIC may produce a binary signal indicating whether a nontrusted onlooker is detected and the privacy controller 230 may control the display 210 based on the state of the binary signal.

Figure 3:
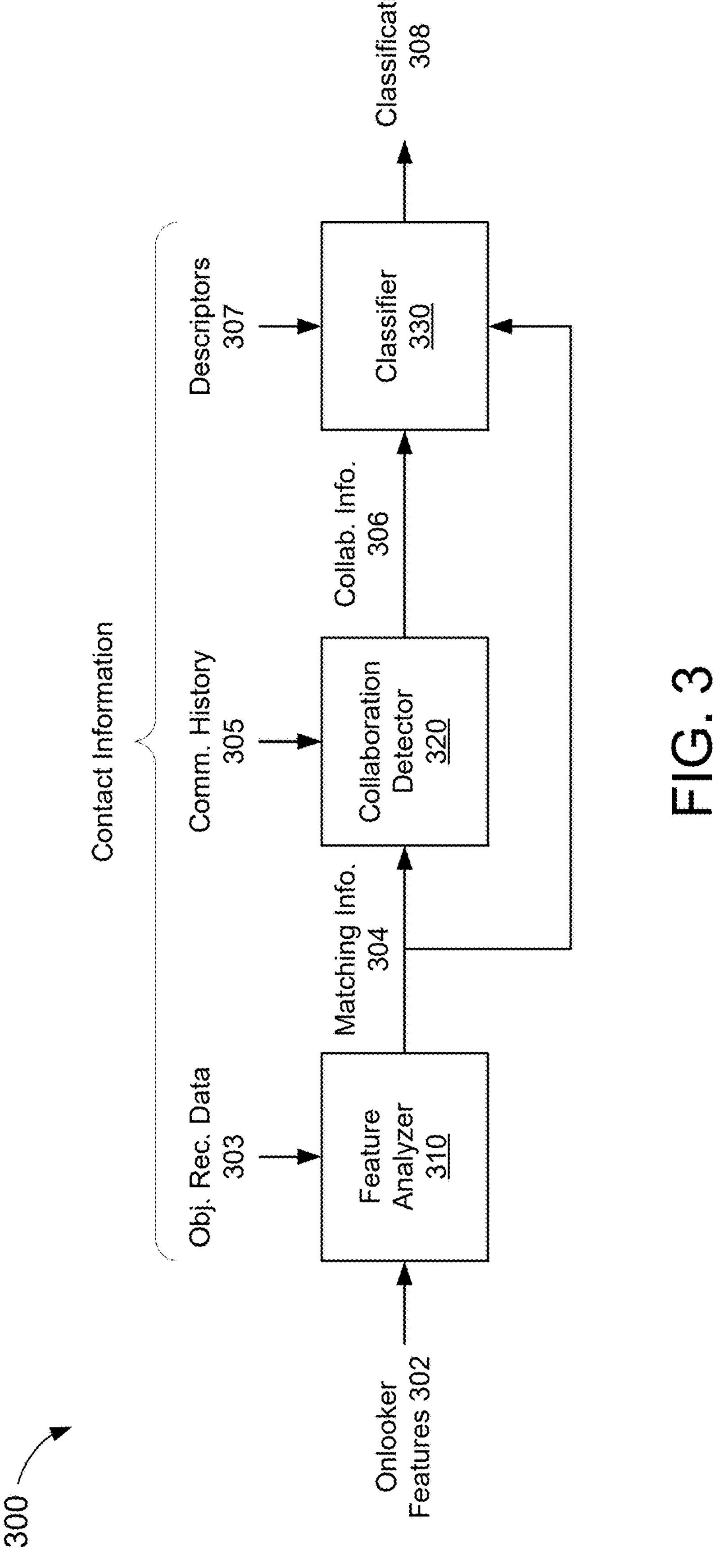
FIG. 3 shows a block diagram of an example onlooker classification system for a personal computing device, according to some implementations.

FIG. 3 shows a block diagram of an example onlooker classification system 300 for a personal computing device, according to some implementations. The onlooker classification system 300 is configured to receive a set of features 302 representing an onlooker and classify the onlooker as a trusted onlooker or a nontrusted onlooker based on contact information stored in a database of contacts associated with an authorized user of the personal computing device. In some implementations, the onlooker classification system 300 may be one example of the onlooker classification component 236 of FIG. 2. With reference to FIG. 2, the set of features 302 may be extracted from sensor data 204 by the object detection component 232.

In the example of FIG. 3, the contact information is shown to include object recognition data 303, a history of communications 305 with the user, and one or more descriptors 307 for each contact in the database. As described with reference to FIG. 2, the object recognition data 303 may include various media or sensor data from which features can be extracted and used to identify each contact in the database of contacts (such as an image of the corresponding contact's face or an audio recording of the corresponding contact's voice). The communications history 305 may include a record of previous communications between the user and the corresponding contact (including phone calls, email exchanges, or meetings) or an indication of how frequently the user communicates with the contact. The descriptors 307 may include a role or title of the corresponding contact within an organization, a team or department to which the contact belongs, or a personal relationship between the contact and the user (such as parent, child, or sibling).

The onlooker classification system 300 includes a feature analyzer 310, a collaboration detector 320, and a classifier 330. The feature analyzer 310 is configured to determine whether the onlooker features 302 match any of the object recognition data 303 stored in the contacts database. In some aspects, the feature analyzer 310 may extract a set of features from the object recognition data 303 associated with each contact and compare the onlooker features 302 with the features for each contact. In some implementations, the feature analyzer 310 may utilize a machine learning model to compare the onlooker features 302 with the object recognition data 303. The feature analyzer 310 further outputs matching information 304 indicating whether the onlooker features 302 match any of the object recognition data 303 stored in the database. In some implementations, where a match is detected, the matching information 304 also may identify the matching contact.

The collaboration detector 320 is configured to determine whether a matching contact (indicated by the matching information 304) is a frequent collaborator of the user based on the communications history 305 associated with the contact. For example, the collaboration detector 320 may determine that a contact is a frequent collaborator if the communications history 305 indicates that the contact has had at least a threshold number of prior communications with the user. In some implementations, certain types of communications (such as phone calls, email exchanges, or meetings) may be weighted more heavily towards the determination than others. The weights and thresholds for determining whether a contact is a frequent collaborator can be preconfigured, configured by the user, or configured by a system administrator of an organization.

In some aspects, the collaboration detector 320 may leverage an existing list of frequent contacts in determining whether a contact is a frequent collaborator. For example, some email clients may store a list of "frequent contacts" based on a history of email exchanges between the user and various contacts in the user's contacts list. Thus, the communications history 305 may indicate whether the corresponding contact is included in the list of frequent contacts. In some implementations, the collaboration detector 320 may determine that a contact is a frequent collaborator if the contact is included in the list of frequent contacts. The collaboration detector 320 further outputs collaboration information 306 indicating whether the matching contact is a frequent collaborator of the user.

The classifier 330 is configured to determine the classification 308 for the onlooker based, at least in part, on the matching information 304. For example, the classifier 330 may classify the onlooker as a nontrusted onlooker if the matching information 304 indicates that the onlooker does not match any of the contacts in the database. If the matching information 304 indicates that the onlooker matches a contact in the database, the classifier 330 may further determine the classification 308 for the onlooker based on the collaboration information 306 and the descriptors 307 associated with the matching contact. In some implementations, the classifier 330 may classify the onlooker as a trusted onlooker if the collaboration information 306 indicates that the matching contact is a frequent collaborator of the user.

If the collaboration information 306 indicates that the matching contact is not a frequent collaborator, the classifier 330 may compare the descriptors 307 for the contact with a set of criteria associated with trusted onlookers. For example, contacts who are managers or supervisors (according to an organizational chart or hierarchy), or members of the same team, as the user may be whitelisted as trusted onlookers. In some implementations, the collaboration information 306 may be weighed against the descriptors 307 in determining the classification 308. The weights and criteria for determining whether a contact is a trusted onlooker can be preconfigured, configured by the user, or configured by a system administrator of an organization.

Figure 4A:
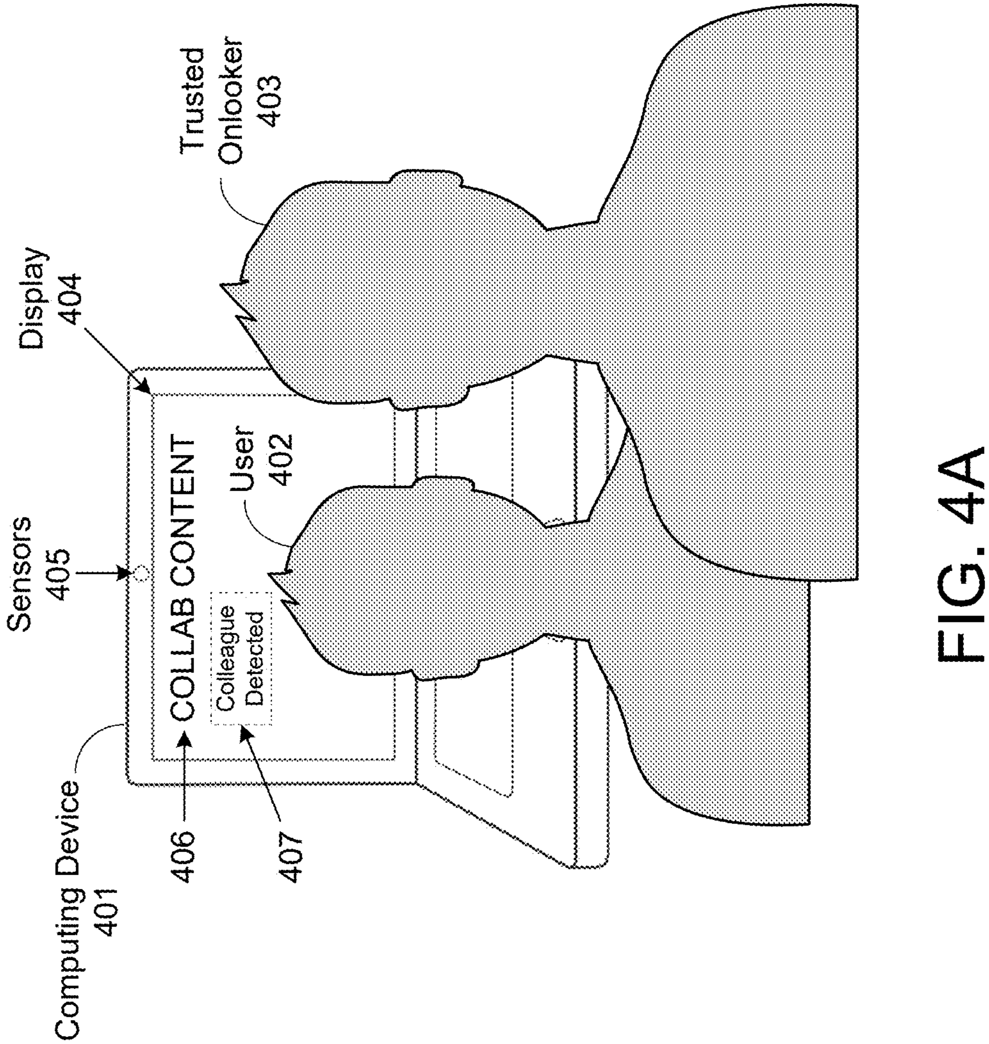
FIG. 4A shows an example operating environment for a personal computing device with privacy protection based on onlooker detection and classification, according to some implementations.
Figure 4A:
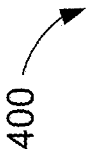

FIG. 4A shows an example operating environment 400 for a personal computing device 401 with privacy protection based on onlooker detection and classification, according to some implementations. In some implementations, the personal computing device 401 may be one example of any of the computing devices 110 or 200 of FIGS. 1 and 2, respectively. The example environment 400 includes an authorized user 402 of the computing device 401 and an onlooker 403 standing or sitting behind the user 402.

The computing device 401 includes a display 404 and one or more sensors 405. In some aspects, the computing device 401 may continuously or periodically scan the surrounding environment for onlookers, using the sensors 405, and control the display 404 based on a detection and classification of one or more onlookers (such as described with reference to FIGS. 1-3). For example, the computing device 401 may identify the user 402 (as an authorized user) based on sensor data captured via the sensors 405 and also may detect the onlooker 403 from the sensor data. The computing device 401 may further determine, based on feature analysis, that the onlooker 403 matches a known contact stored in a database of contacts associated with the user 402. In the example of FIG. 4A, the computing device 401 may classify the onlooker 403 as a trusted onlooker based on the matching contact.

Because the onlooker 403 is classified as a trusted onlooker, the computing device 401 may refrain from activating any privacy protection mechanisms associated with the display 404. In some aspects, the computing device 401 may allow the user 402 and the trusted onlooker 403 to continue viewing collaborative content 406 presented on the display 404 (shown as "COLLAB CONTENT" in FIG. 4A) without interruption. In some other aspects, the computing device 401 may display a notification 407 on the display 404 indicating that a trusted onlooker has been detected. In some implementations, the notification 407 may include a name or other identifying information associated with the trusted onlooker 403 (such as "colleague detected" as shown in FIG. 4A).

Figure 4B:
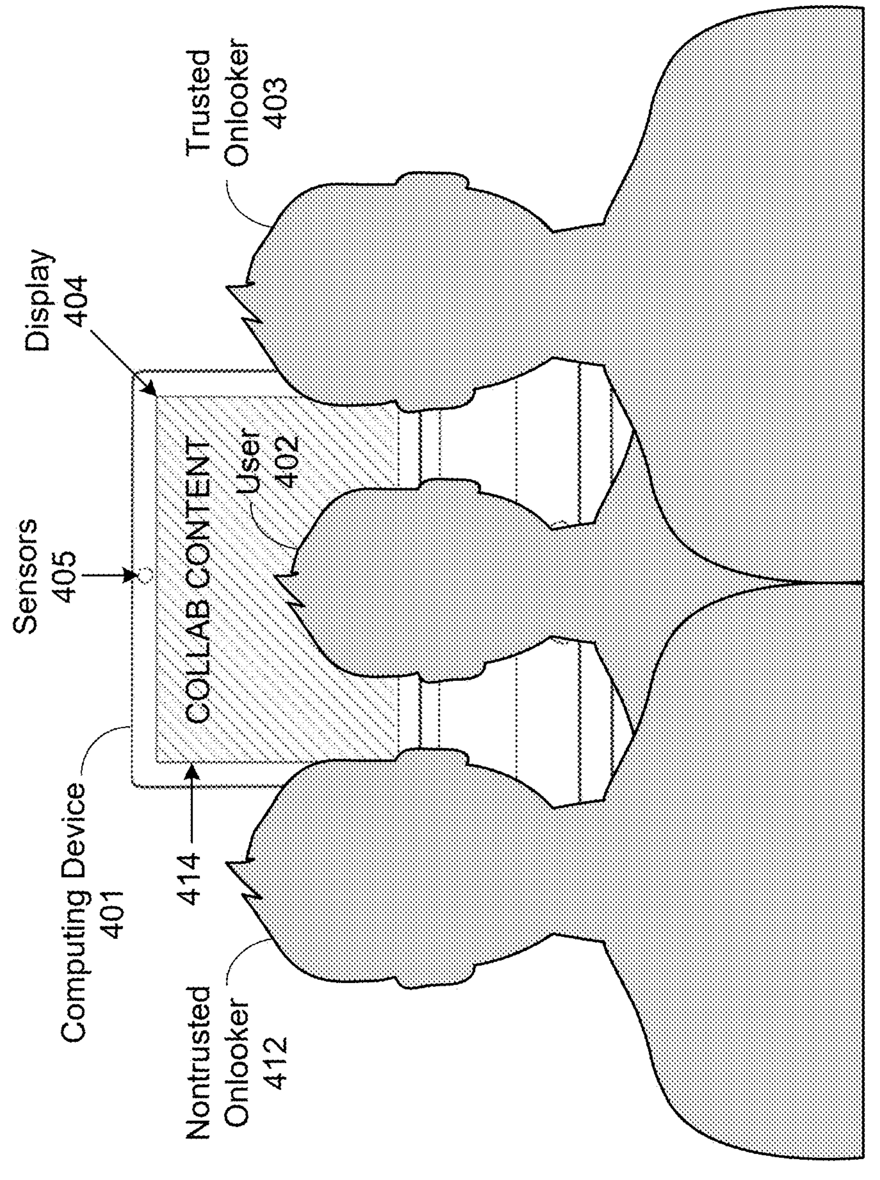
FIG. 4B shows another example operating environment for a personal computing device with privacy protection based on onlooker detection and classification, according to some implementations.
Figure 4B:

FIG. 4B shows another example operating environment 410 for the personal computing device 401, according to some implementations. The example environment 410 includes the authorized user 402, the onlooker 403, and a second onlooker 412.

In the example of FIG. 4B, the computing device 401 may identify the user 402 (as an authorized user) based on sensor data captured via the sensors 405 and also may detect the onlookers 403 and 412 from the sensor data. In the example of FIG. 4B, the computing device 401 may classify the onlooker 403 as a trusted onlooker (such as described with reference to FIG. 4A) and may classify the second onlooker 412 as a nontrusted onlooker. In some implementations, the computing device 401 may determine, based on feature analysis, that the onlooker 412 does not match any known contacts stored in the database of contacts associated with the user 402. In some other implementations, the computing device 401 may determine that the onlooker 412 matches a known contact but the matching contact does not meet the criteria for a trusted onlooker (such as described with reference to FIG. 3).

In response to classifying the onlooker 412 as a nontrusted onlooker, the computing device 401 may activate one or more privacy protection mechanisms associated with the display 404. In the example of FIG. 4B, the computing device 401 is shown to obfuscate the display 404 so that collaborative content 414 presented on the display is difficult (if not impossible) for the nontrusted onlooker 412 to read. For example, the obfuscated content 414 may appear blurry, texturized, or opaque. Aspects of the present disclosure recognize that, in some instances, the user 402 may not be viewing private or confidential content on the computing device 401. In such instances, the computing device 401 may provide a poor user experience by obfuscating the display 404 in response to detecting the nontrusted onlooker 412. Thus, in some aspects, the computing device 401 may implement different privacy protection mechanisms depending on the situation, user preferences, or security threat level.

Figure 4C:
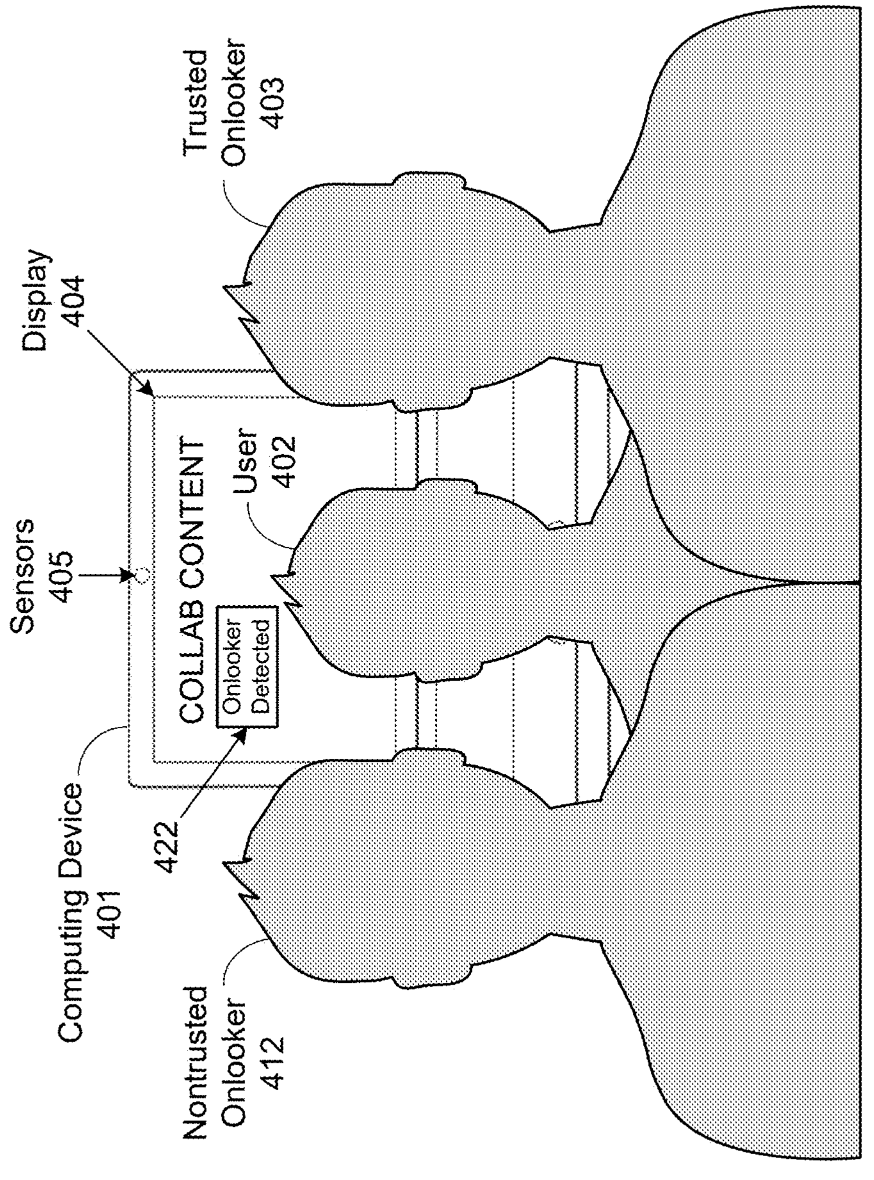
FIG. 4C shows another example operating environment for a personal computing device with privacy protection based on onlooker detection and classification, according to some implementations.

FIG. 4C shows another example operating environment 420 for the personal computing device 401, according to some implementations. The example environment 420 includes the authorized user 402 and the onlookers 403 and 412.

The computing device 401 may identify the user 402 (as an authorized user) based on sensor data captured via the sensors 405 and also may detect the onlookers 403 and 412 from the sensor data. In the example of FIG. 4C, the computing device 401 may classify the onlooker 403 as a trusted onlooker (such as described with reference to FIG. 4A) and may classify the onlooker 412 as a nontrusted onlooker (such as described with reference to FIG. 4B). In response to classifying the onlooker 412 as a nontrusted onlooker, the computing device 401 may activate one or more privacy protection mechanisms associated with the display 404.

In the example of FIG. 4C, the computing device 401 is shown to display a notification 422 on the display 404 indicating that a nontrusted onlooker has been detected. In contrast with the obfuscated content 414 of FIG. 4B, the notification 422 does not significantly impede the ability of the user 402 to view collaborative content on the display 404. However, the notification 422 also does not provide the same degree of privacy protection from the nontrusted onlooker 412 as the obfuscated content 414. Thus, in some aspects, the computing device 401 may implement a combination of the privacy protection mechanisms described with reference to FIGS. 4B and 4C. For example, the computing device 401 may obfuscate the display 404 when the nontrusted onlooker 412 is first detected, and if the user 402 dismisses or overrides the privacy protection mechanism, the computing device 401 may only display the notification 422 in response to subsequent detections of the nontrusted onlooker 412.

Aspects of the present disclosure further recognize that the level of trust between the authorized user and an onlooker also may depend on the type of content being presented on the display. For example, a user may not wish to share certain types of information (such as personal banking records) with any onlooker, regardless of their relationship with the user. However, in some instances, the user may inadvertently trigger such personal information to be presented on the display while collaborating with an onlooker (such as by accidentally switching to the wrong application or pop-up window). Thus, in some aspects, an onlooker classification system may further classify onlookers based, at least in part, on the type of content presented on the display.

Figure 5:
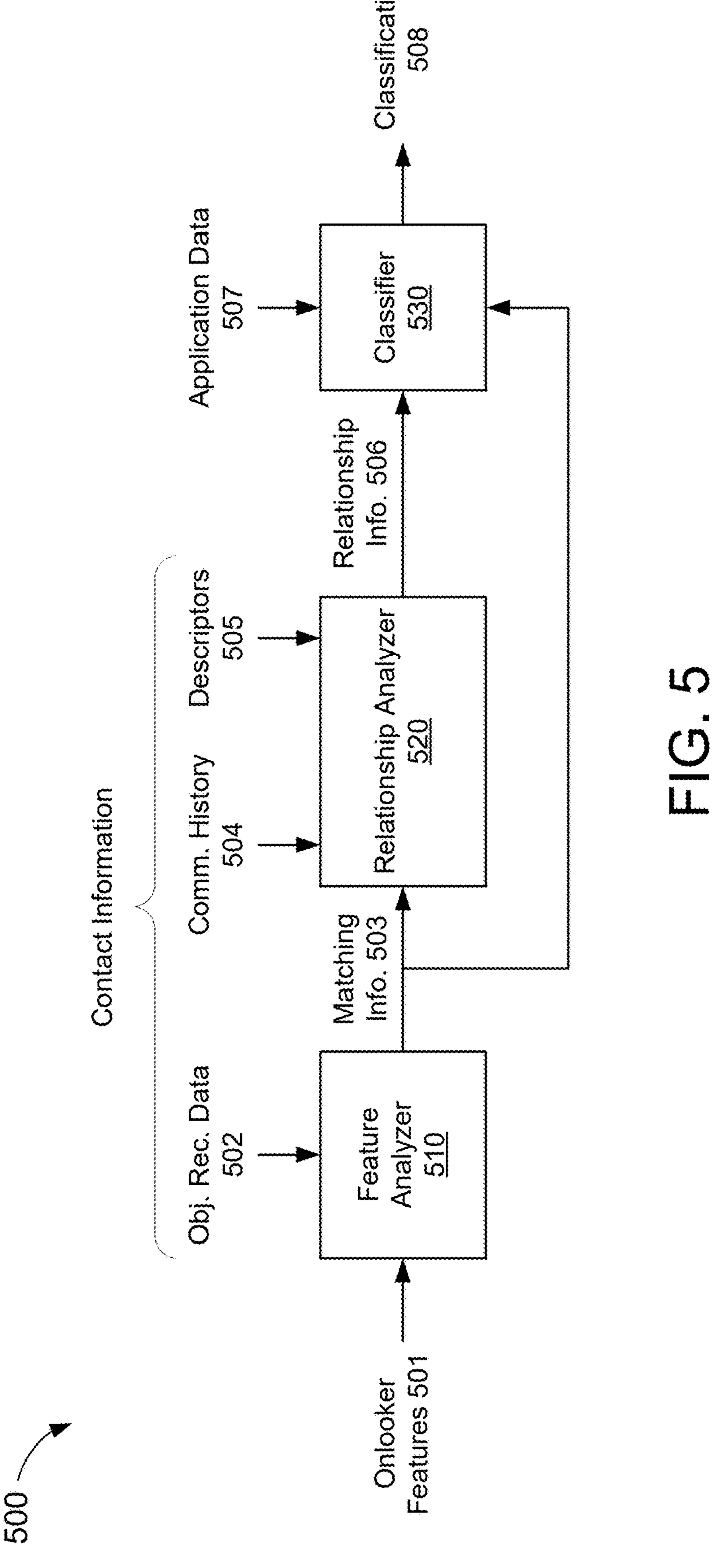
FIG. 5 shows another block diagram of an example onlooker classification system for a personal computing device, according to some implementations.

FIG. 5 shows another block diagram of an example onlooker classification system 500 for a personal computing device, according to some implementations. The onlooker classification system 500 is configured to receive a set of features 501 representing an onlooker and classify the onlooker as a trusted onlooker or a nontrusted onlooker for a particular type of application data 507 presented on a display based on contact information stored in a database of contacts associated with an authorized user of the personal computing device. In some implementations, the onlooker classification system 500 may be one example of the onlooker classification component 236 of FIG. 2. With reference to FIG. 2, the application data 507 may be one example of the display data 202 and the set of features 501 may be extracted from sensor data 204 by the object detection component 232.

In the example of FIG. 5, the contact information is shown to include object recognition data 502, a history of communications 504 with the user, and one or more descriptors 505 for each contact in the database. As described with reference to FIG. 1, the object recognition data 502 may various media or sensor data form which features can be extracted and used to identify each contact in the database of contacts (such as an image of the contact's face or an audio recording of the contact's voice). The communications history 504 may include a record of previous communications between the user and the corresponding contact (including phone calls, email exchanges, or meetings) or an indication of how frequently the user communicates with the contact. The descriptors 505 may include a role or title of the corresponding contact within an organization, a team or department to which the contact belongs, or a personal relationship between the contact and the user (such as parent, child, or sibling).

The onlooker classification system 500 includes a feature analyzer 510, a relationship analyzer 520, and a classifier 530. The feature analyzer 510 is configured to determine whether the onlooker features 501 match any of the object recognition data 502 stored in the contacts database. In some aspects, the feature analyzer 510 may extract a set of features from the object recognition data 502 associated with each contact and compare the onlooker features 501 with the features for each contact. In some implementations, the feature analyzer 510 may utilize a machine learning model to compare the onlooker features 501 with the object recognition data 502. The feature analyzer 510 further outputs matching information 503 indicating whether the onlooker features 501 match any of the object recognition data 502 stored in the database. In some implementations, where a match is detected, the matching information 503 also may identify the matching contact.

The relationship analyzer 520 is configured to determine a relationship between the user and a matching contact (indicated by the matching information 503) based on the communications history 504 and the descriptors 505 associated with the contact (such as described with reference to FIG. 3). In some implementations, the relationship analyzer 520 may determine relationship information 506 indicating whether the matching contact is a frequent collaborator of the user based on the communications history 504 associated with the contact. In some other implementations, the relationship analyzer 520 may determine relationship information 506 indicating whether the matching contact belongs to the same team or group within an organization as the user based on the descriptors 505 for the contact.

The classifier 530 is configured to determine the classification 508 for the onlooker based on the matching information 503, the relationship information 506, and the application data 507. For example, the classifier 530 may classify the onlooker as a nontrusted onlooker for the application data 507 if the matching information 503 indicates that the onlooker does not match any of the contacts in the database. If the matching information 503 indicates that the onlooker matches a contact in the database, the classifier 530 may further determine the classification 508 for the onlooker based on the relationship information 506 associated with the matching contact and the application data 507. In some aspects, the classifier 530 may determine whether the relationship information 506 satisfies a set of criteria associated with trusted onlookers for the application data 507. For example, the criteria may include a predetermined list of applications (or websites) or may be configured by the user or a system administrator for an organization.

In some implementations, the user may specify one or more applications that are private to the user and should not be viewed by any onlookers. In such implementations, the classifier 530 may classify all onlookers as nontrusted onlookers for application data 507 associated with private applications. In some other implementations, the user or system administrator may authorize individual contacts in the contacts database, or contacts having a particular relationship with the user, to view certain types of application data. For example, the user may authorize a partner or spouse to view the user's personal banking information. As another example, a system administrator for an organization may authorize members of the organization with certain roles or titles, such as a chief financial officer (CFO) or a manager of the user in the finance department, to view the organization's corporate banking information.

The classifier 530 may classify an onlooker as a trusted onlooker only if the matching contact satisfies the set of criteria associated with trusted onlookers for the particular type of application data 507 presented on the display. Thus, the onlooker classification system 500 may classify onlookers with finer granularity than the onlooker classification system 300. In some aspects, where multiple applications are presented on a display, the classifier 530 may determine a respective classification 508 for each of the applications (for each detected onlooker). As a result, an onlooker may be classified as a trusted onlooker for application data associated with one of the applications and may be classified as a nontrusted onlooker for application data associated with another of the applications. In some implementations, a privacy controller (such as the privacy controller 230 of FIG. 2) may obfuscate only the content for which a nontrusted onlooker is detected.

Figure 6:
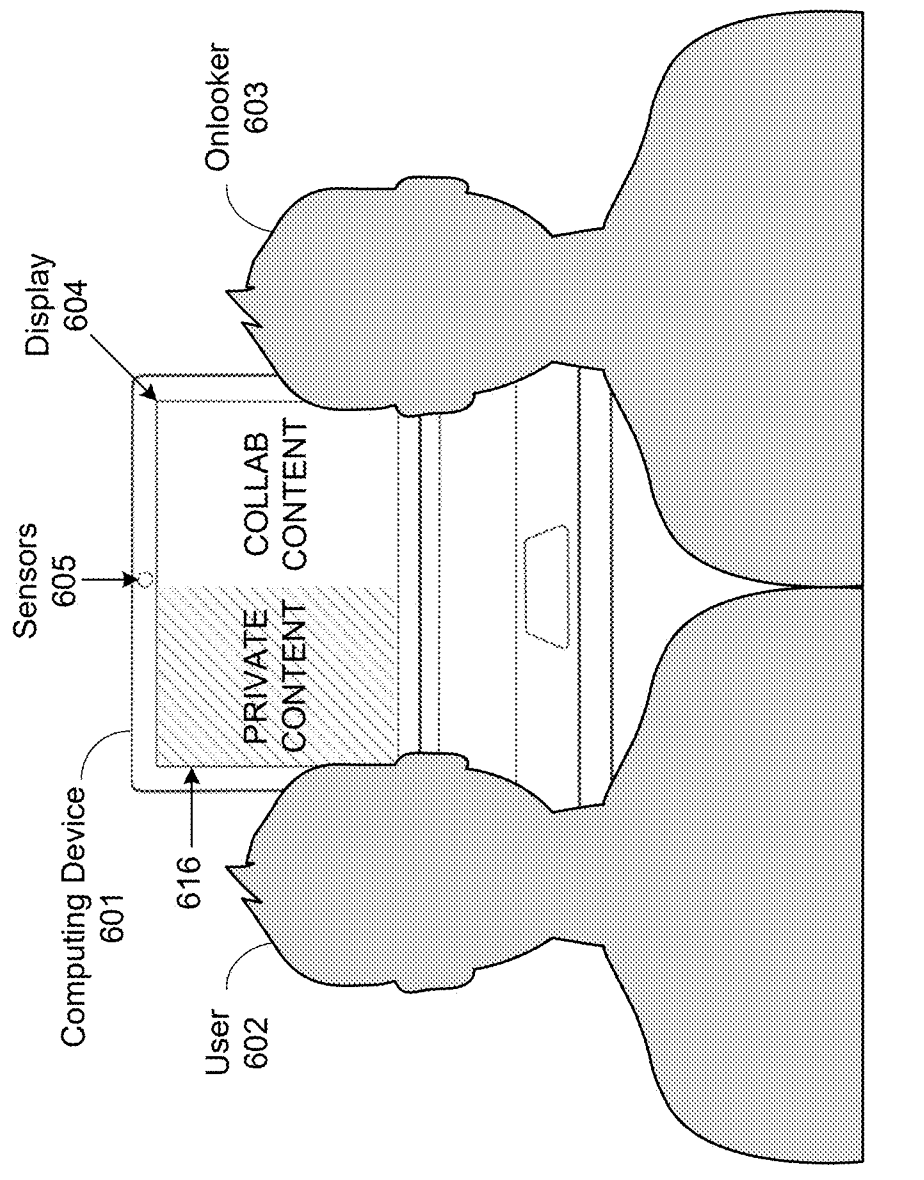
FIG. 6 shows another example operating environment for a personal computing device with privacy protection based on onlooker detection and classification, according to some implementations.

FIG. 6 shows another example operating environment 600 for a personal computing device 601 with privacy protection based on onlooker detection and classification, according to some implementations. In some implementations, the personal computing device 601 may be one example of any of the computing devices 110 or 200 of FIGS. 1 and 2, respectively. The example environment 600 includes an authorized user 602 of the computing device 601 and an onlooker 603 standing or sitting beside the user 602.

The computing device 601 includes a display 604 and one or more sensors 605. In some aspects, the computing device 601 may continuously or periodically scan the surrounding environment for onlookers, using the sensors 605, and control the display 604 based on a detection and classification of one or more onlookers (such as described with reference to FIGS. 1-3 and 5). For example, the computing device 601 may identify the user 602 (as an authorized user) based on sensor data captured via the sensors 605 and also may detect the onlooker 603 from the sensor data. The computing device 601 may further determine, based on feature analysis, that the onlooker 603 matches a known contact stored in a database of contacts associated with the user 602. In the example of FIG. 6, the computing device 601 may classify the onlooker 603 as a trusted onlooker for collaborative content presented on the right side of the display 604 (shown as "COLLAB CONTENT" in FIG. 6) and as a nontrusted onlooker for private content presented on the left side of the display 604 (shown as "PRIVATE CONTENT" in FIG. 6).

Because the onlooker 603 is classified as a trusted onlooker for the collaborative content, the computing device 601 may refrain from activating any privacy protection mechanisms for the right side of the display 604. In other words, the computing device 601 may allow the user 602 and the onlooker 603 to continue viewing the collaborative content without interruption. However, because the onlooker 603 is classified as a nontrusted onlooker for the private content, the computing device 601 may obfuscate the left side of the display 604. For example, the private content may appear blurry, texturized, or opaque. Although the collaborative content and private content are presented side-by-side in the example of FIG. 6, various other presentations are also possible. For example, in some implementations, the collaborative content may be presented as a pop-up window or overlay on top of the private content. In such implementations, only the background portions of the display 604 which contain the private content may be obfuscated.

Figure 7:
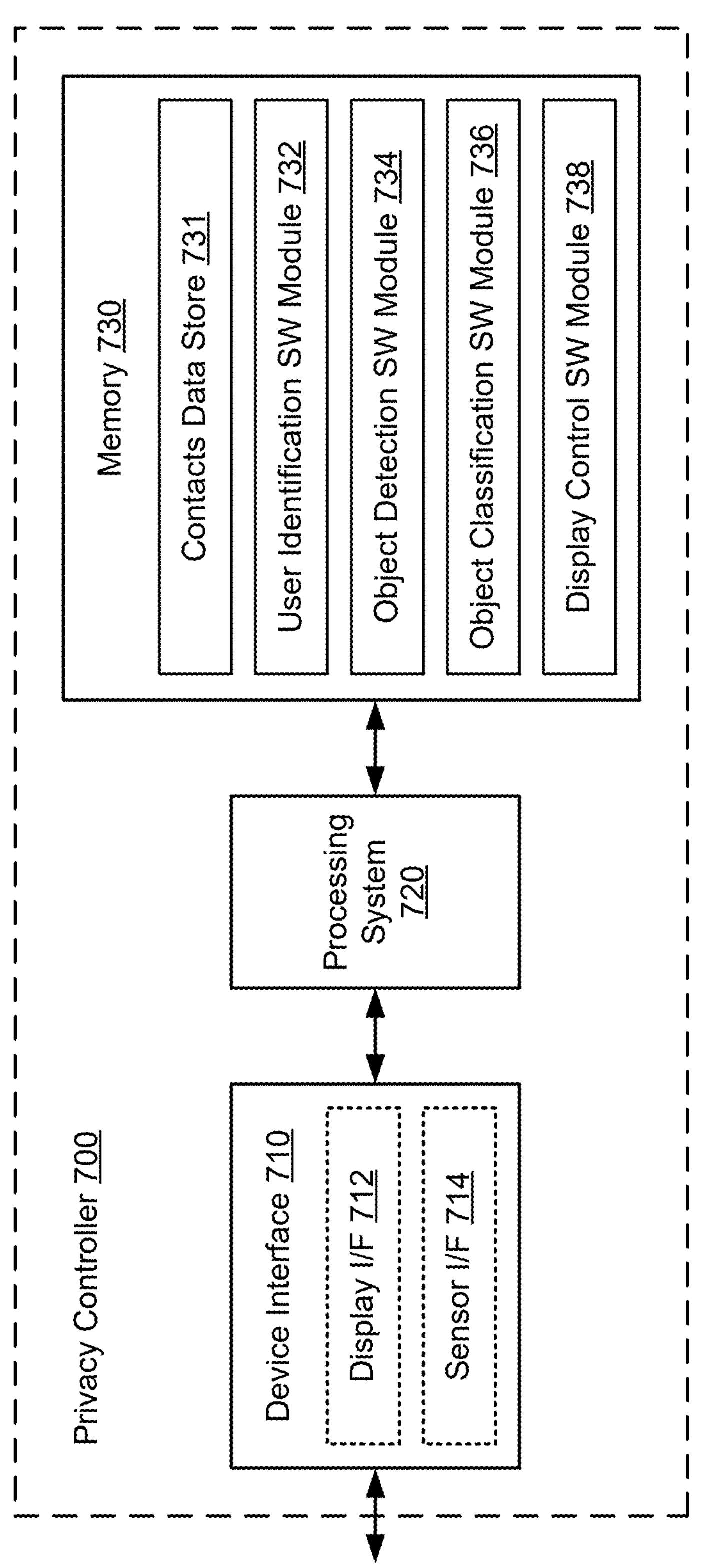
FIG. 7 shows a block diagram of an example privacy controller for a personal computing device, according to some implementations.

FIG. 7 shows a block diagram of an example privacy controller 700 for a personal computing device, according to some implementations. The privacy controller 700 is configured to detect and classify onlookers based on sensor data captured by one or more sensors associated with the personal computing device and control a display associated with the personal computing device based on the detection and classification of onlookers. In some implementations, the privacy controller 700 may be one example of the privacy controller 230 of FIG. 2.

The privacy controller 700 includes a device interface 710, a processing system 720, and a memory 730. The device interface 710 is configured to communicate with one or more components of the personal computing device. In some implementations, the device interface 710 may include a display interface (I/F) 712 and a sensor interface (I/F) 714. The display interface 712 is configured to communicate with the display associated with the personal computing device (such as the display 210 of FIG. 2). The sensor interface 714 is configured to communicate with the one or more sensors associated with the personal computing device (such as the sensors 220 of FIG. 2). In some implementations, the sensor interface 714 may receive sensor data from the one or more sensors associated with the personal computing device.

The memory 730 may include a contacts data store 731 configured to store a database of contacts associated with an authorized user of the personal computing device (such as the contacts database 240 of FIG. 2). The memory 730 also may include a non-transitory computer-readable medium (including one or more nonvolatile memory elements, such as EPROM, EEPROM, Flash memory, or a hard drive, among other examples) that may store at least the following software (SW) modules:

- a user identification SW module 732 to identify an authorized user of the computing device based on the received sensor data;
- an object detection SW module 734 to detect one or more objects of interest associated with the received sensor data, where the one or more objects of interest are separate from the authorized user;
- an object classification SW module 736 to classify each object of interest of the one or more objects of interest based at least in part on a database of contacts associated with the authorized user; and
- a display control SW module 738 to control a display associated with the computing device based on the classification of each object of interest.

Each software module includes instructions that, when executed by the processing system 720, causes the privacy controller 700 to perform the corresponding functions.

The processing system 720 may include any suitable one or more processors capable of executing scripts or instructions of one or more software programs stored in the privacy controller 700 (such as in the memory 730). For example, the processing system 720 may execute the user identification SW module 732 to identify an authorized user of the computing device based on the received sensor data. The processing system 720 also may execute the object detection SW module 734 to detect one or more objects of interest associated with the received sensor data, where the one or more objects of interest are separate from the authorized user. Further, the processing system 720 may execute the object classification SW module 736 to classify each object of interest of the one or more objects of interest based at least in part on a database of contacts associated with the authorized user. Still further, the processing system 720 may execute the display control SW module 738 to control a display associated with the computing device based on the classification of each object of interest.

Figure 8:
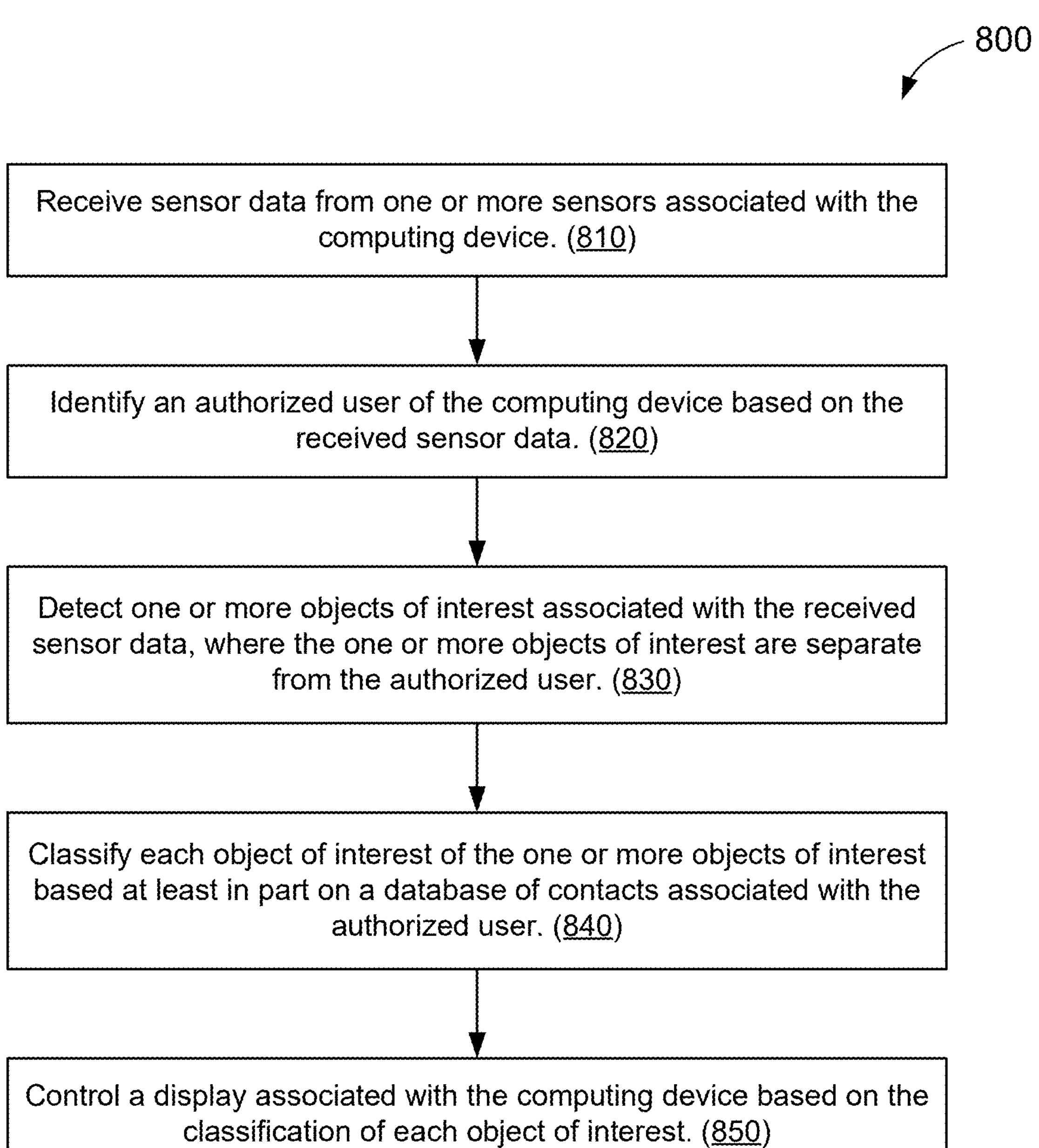
FIG. 8 shows an illustrative flowchart depicting an example operation for protecting the privacy of a user of a personal computing device in the presence of onlookers, according to some implementations.

FIG. 8 shows an illustrative flowchart depicting an example operation 800 for protecting the privacy of a user of a personal computing device in the presence of onlookers, according to some implementations. In some implementations, the example operation 800 may be performed by a privacy controller for the personal computing device, such as any of the privacy controllers 230 or 700 of FIGS. 2 and 7, respectively.

The privacy controller receives sensor data from one or more sensors associated with the computing device (810). The privacy controller identifies an authorized user of the computing device based on the received sensor data (820). The privacy controller also detects one or more objects of interest associated with the received sensor data, where the one or more objects of interest are separate from the authorized user (830). The privacy controller classifies each object of interest of the one or more objects of interest based at least in part on a database of contacts associated with the authorized user (840). The privacy controller further controls a display associated with the computing device based on the classification of each object of interest (850).

In some aspects, the data base may store object recognition data associated with one or more contacts. In some implementations, the object recognition data may include one or more images associated with the one or more contacts. In some other implementations, the object recognition data may include one or more voice recordings associated with the one or more contacts. In some aspects, the classifying of each detected object of interest may include determining whether the object of interest matches any of the object recognition data stored in the database. In some implementations, the controlling of the display may include outputting a notification to the display responsive to determining that at least one object of interest of the one or more objects of interest does not match any of the object recognition data stored in the database.

In some aspects, the privacy controller may further determine a relationship between the authorized user and a first contact of the one or more contacts responsive to determining that the object of interest matches the object recognition data associated with the first contact, where the object of interest is classified based at least in part on the relationship between the authorized user and the first contact. In some implementations, the database may further store information indicating an organizational role or title associated with each contact of the one or more contacts, and the relationship between the authorized user and the first contact may be determined based at least in part on the organizational role or title associated with the first contact. In some other implementations, the database may further store information indicating a history of communication between the authorized user and each contact of the one or more contacts, and the relationship between the authorized user and the first contact may be determined based at least in part on the history of communication between the authorized user and the first contact.

In some aspects, the privacy controller may further determine a type of content presented on the display, where the object of interest is further classified based at least in part on the type of content presented on the display. In some implementations, the object of interest may be classified as a trusted onlooker for the type of content presented on the display responsive to determining that the relationship between the authorized user and the first contact satisfies a set of criteria associated with type of content. In some other implementations, the object of interest may be classified as a nontrusted onlooker for the type of content presented on the display responsive to determining that the relationship between the authorized user and the first contact does not satisfy a set of criteria associated with type of content. In some implementations, the controlling of the display may include obfuscating the content presented on the display responsive to classifying at least one object of interest of the one or more objects of interest as a nontrusted onlooker for the type of content.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a controller for a computing device, comprising:

receiving sensor data from one or more sensors associated with the computing device;

identifying an authorized user of the computing device based on the received sensor data;

detecting one or more objects of interest associated with the received sensor data, the one or more objects of interest including one or more unrecognized persons that are not identified as the authorized user;

extracting one or more features from the sensor data for each of the one or more unrecognized persons;

retrieving contact information from an address book managed by a phone or email client configured for the authorized user or from an organizational directory provided by an organization to which the authorized user belongs, wherein the contact information includes object recognition data for one or more contacts within the address book or organizational directory;

classifying each unrecognized person of the one or more unrecognized persons as a trusted onlooker or a nontrusted onlooker based on whether the one or more features extracted for the unrecognized person match the object recognition data; and controlling a display associated with the computing device based on classifying each unrecognized person.

2. The method of claim 1, wherein the object recognition data includes one or more images or voice recordings associated with the one or more contacts.

3. The method of claim 1, wherein the controlling of the display comprises:

outputting a notification to the display responsive to determining that the one or more features for at least one unrecognized person of the one or more unrecognized persons do not match the object recognition data.

4. The method of claim 1, further comprising:

determining a relationship between the authorized user and a first contact of the one or more contacts responsive to determining that the one or more features for at least one unrecognized person of the one or more unrecognized persons match the object recognition data associated with the first contact, the at least one unrecognized person being classified based at least in part on the relationship between the authorized user and the first contact.

5. The method of claim 4, further comprising storing information indicating an organizational role or title associated with each contact of the one or more contacts in a database, the relationship between the authorized user and the first contact being determined based at least in part on the organizational role or title associated with the first contact.

6. The method of claim 4, further comprising storing information indicating a history of communication between the authorized user and each contact of the one or more contacts in a database, the relationship between the authorized user and the first contact being determined based at least in part on the history of communication between the authorized user and the first contact.

7. The method of claim 4, further comprising:

determining a type of content presented on the display, the at least one unrecognized person further being classified based at least in part on the type of content presented on the display.

8. The method of claim 7, wherein the at least one unrecognized person is classified as a trusted onlooker for the type of content presented on the display responsive to determining that the relationship between the authorized user and the first contact satisfies a set of criteria associated with type of content.

9. The method of claim 7, wherein the at least one unrecognized person is classified as a nontrusted onlooker for the type of content presented on the display responsive to determining that the relationship between the authorized user and the first contact does not satisfy a set of criteria associated with the type of content.

10. The method of claim 9, wherein the controlling of the display comprises:

obfuscating the content presented on the display responsive to classifying at least one unrecognized person of the one or more unrecognized persons as a nontrusted onlooker for the type of content.

11. The method of claim 1, wherein the authorized user is identified, the one or more objects are detected, and the one or more unrecognized persons are classified within a trusted execution environment (TEE) provided by an application-specific integrated circuit (ASIC) of the computing device.

12. The method of claim 11, wherein:

the ASIC is separate from a central processor of the computing device that executes an operating system; and the TEE prevents the sensor data from being accessed by software or hardware outside of the TEE.

13. The method of claim 1, wherein;

at least one unrecognized person of the one or more unrecognized persons is classified as a trusted onlooker for first content displayed on the display that is associated with a first application;

the at least one unrecognized person is classified as a nontrusted onlooker for second content displayed on the display that is associated with a second application; and the controlling of the display comprises:

refraining from obfuscating the first content; and obfuscating the second content.

14. A controller for a computing device, comprising:

a processing system; and a memory storing instructions that, when executed by the processing system, causes the controller to:

receive sensor data from one or more sensors associated with the computing device;

identify an authorized user of the computing device based on the received sensor data;

detect one or more objects of interest associated with the received sensor data, the one or more objects of interest including one or more unrecognized persons that are not identified as the authorized user;

extract one or more features from the sensor data for each of the one or more unrecognized persons;

retrieve contact information from an address book managed by a phone or email client configured for the authorized user or from an organizational directory provided by an organization to which the authorized user belongs, wherein the contact information includes object recognition data for one or more contacts within the address book or organizational directory;

classify each unrecognized person of the one or more unrecognized persons as a trusted onlooker or a nontrusted onlooker on whether the one or more features extracted for the unrecognized person match the object recognition data; and control a display associated with the computing device based on classifying each unrecognized person.

15. The controller of claim 14, wherein execution of the instructions further causes the controller to:

determine a relationship between the authorized user and a first contact of the one or more contacts responsive to determining that the one or more features for at least one unrecognized person of the one or more unrecognized persons match the object recognition data associated with the first contact, the at least one unrecognized person being classified based at least in part on the relationship between the authorized user and the first contact.

16. The controller of claim 15, further comprising storing information indicating an organizational role or title associated with each contact of the one or more contacts, the relationship between the authorized user and the first contact being determined based at least in part on the organizational role or title associated with the first contact.

17. The controller of claim 15, further comprising storing information indicating a history of communication between the authorized user and each contact of the one or more contacts, the relationship between the authorized user and the first contact being determined based at least in part on the history of communication between the authorized user and the first contact.

* * * * *